Nov. 25, 1930. W. C. DENHAM 1,782,888
MECHANICAL MOVEMENT
Filed Jan. 18, 1929   3 Sheets-Sheet 1
Fig. 1.
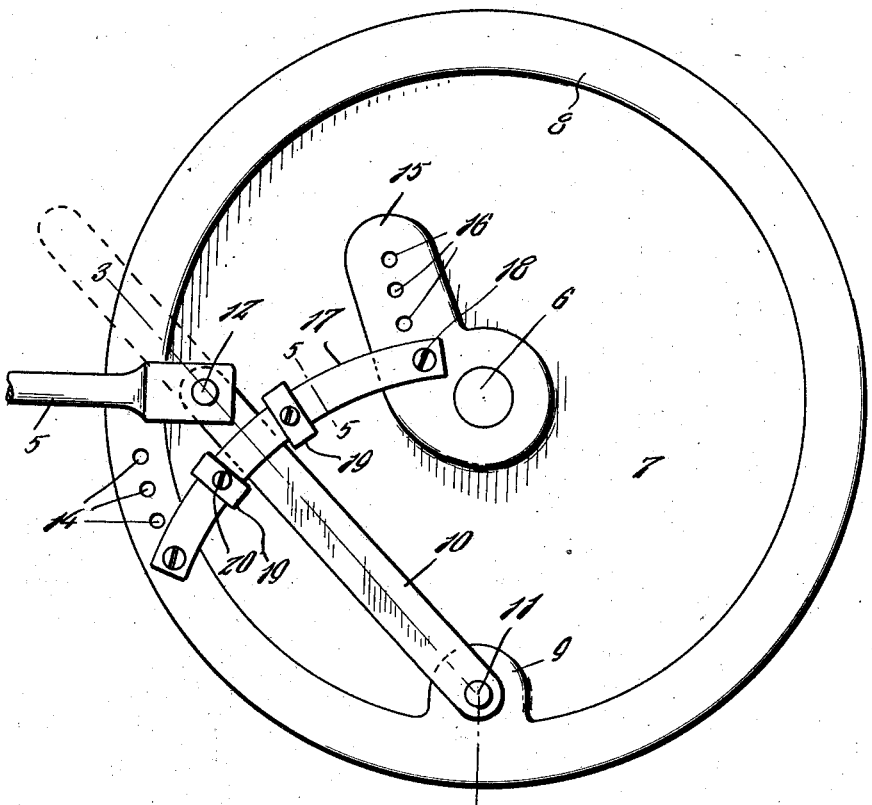
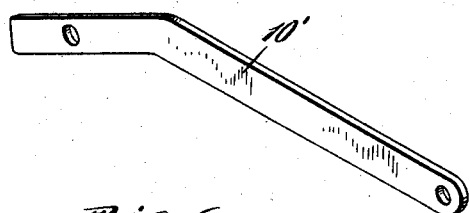
Fig. 4.
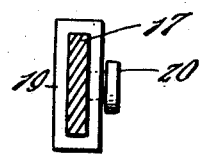
Fig. 5.
Inventor
William C. Denham
By Clarence A. O'Brien
Attorney Nov. 25, 1930.                W. C. DENHAM                    1,782,888
                            MECHANICAL MOVEMENT
                           Filed Jan. 18, 1929      3 Sheets-Sheet 2

Inventor

William C. Denham

By Clarence A. O'Brien
                    Attorney

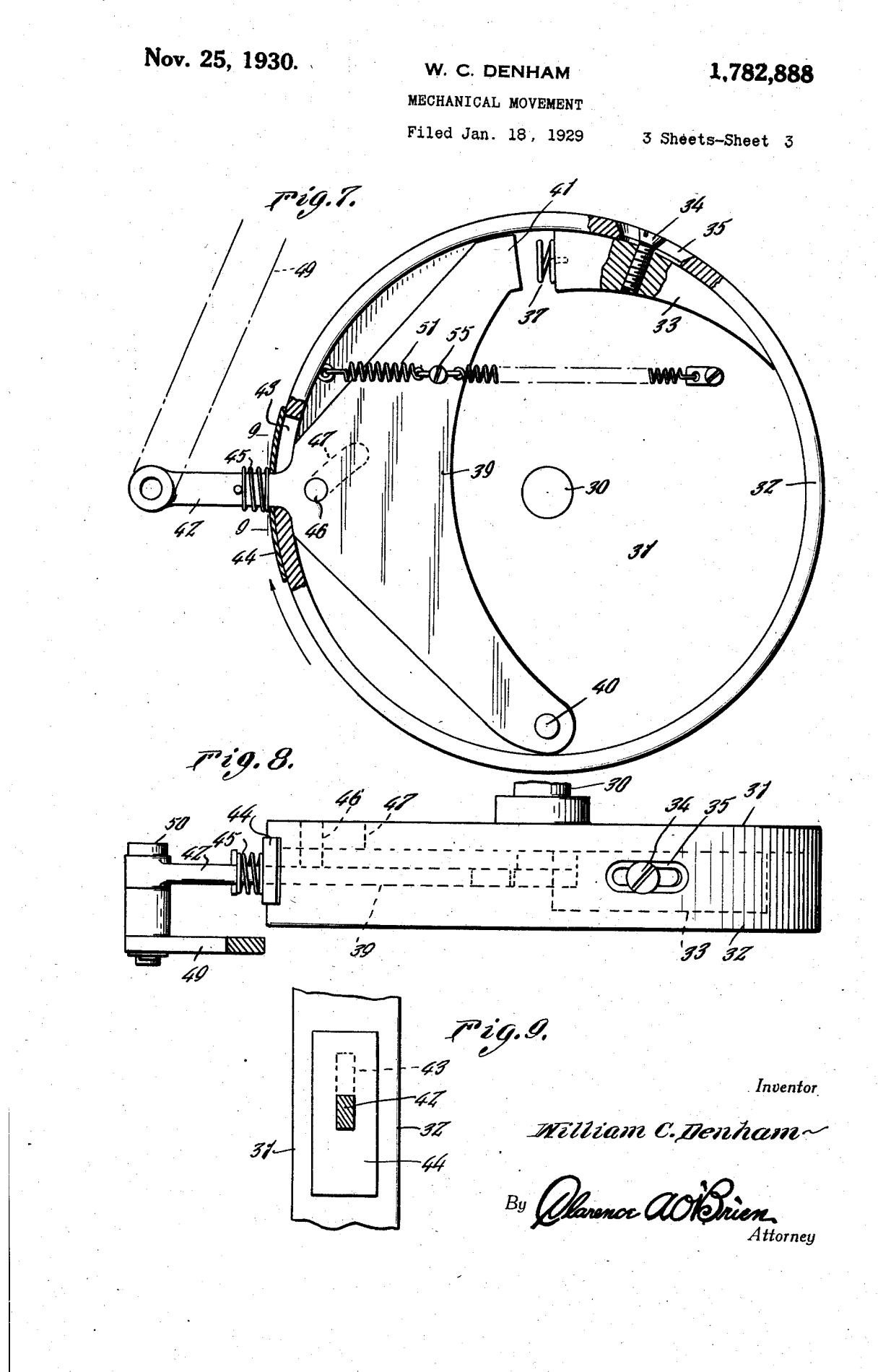

Nov. 25, 1930.                W. C. DENHAM                1,782,888
                           MECHANICAL MOVEMENT
                       Filed Jan. 18, 1929     3 Sheets-Sheet 3

Inventor

William C. Denham

By Clarence A. O'Brien

Attorney

Patented Nov. 25, 1930

1,782,888

UNITED STATES PATENT OFFICE

WILLIAM C. DENHAM, OF KEENSBURG, ILLINOIS

MECHANICAL MOVEMENT

Application filed January 18, 1929. Serial No. 333,438.

The present invention relates generally to mechanical movement and more particularly to a device or assembly for overcoming dead centers in engines, and other rotary devices.

An important object of the invention resides in the provision of a mechanism of this nature which will throw the pivot offset connection of a connecting rod with a rotary member off center.

Another very important object of the invention resides in the provision of a mechanism of this nature which is simple in construction, strong and durable, adjustable, thoroughly efficient and reliable in use and operation, and otherwise well adapted to the purpose for which it is designed.

With the above and numerous other objects in view as will appear as the description proceeds, the invention resides in certain novel features of construction, and in combination and arrangement of parts as will be hereinafter more fully described and claimed.

In the drawing:

Figure 1 is a side elevation of a mechanism embodying the features of my invention.

Figure 2 is a top plan view thereof,

Figure 3 is a sectional view taken substantially on the line 3—3 of Figure 1,

Figure 4 is a perspective view of another embodiment of bar used in this mechanism, Figure 5 is a detail section taken substantially on the line 5—5 of Figure 1, Figure 6 is a perspective view of the bar shown in the assembly of Figure 1.

Figure 7 is a side elevation of another embodiment of the invention showing portions of the section, Figure 8 is a top plan view thereof, Figure 9 is a sectional view taken substantially on the line 9—9 of Figure 7.

Referring to the drawing in detail and particularly the embodiment of the invention disclosed in Figures 1 to 6 inclusive it will be seen that numeral 5 denotes a reciprocating connecting rod, numeral 6 a driven shaft with a wheel or disk 7 keyed thereto and formed with a rim 8.

A lug 9 projects inwardly from the rim and a bar 10 is pivoted thereto as at 11. The rod 5 is pivotally engaged with the bar 10 as at 12. A series of threaded recesses 14 is provided in the rim 8. A crank 15 is fixed on the shaft 6 and has a series of threaded recesses 16.

An arcuate member concentric with the pivot 11 is denoted by the numeral 17 and is detachably fixed by screws 18 engaged in apertures 14 and 16 with the rim 8 and the crank 15 respectively. A pair of stop collars 19 are mounted on the arcuate member 17 and may be held in different adjusted positions by means of set screws 20. One collar is disposed to each side of the bar 10 and limit the swinging movement of this bar 10.

If desired this bar 10 may be of any suitable length or it may be of angular construction as is shown at 10′ in Figure 4.

From the above detailed description it will be seen that when the connecting rod is in operation and on center and is pushed, the bar 10 is swung so as to abut the collar 19 closer to the shaft 6 and thereby placing the pin 12 off center so that the wheel or disk 7 and the shaft 6 will readily turn in the proper direction and just the reverse would occur should the pin be on the outside of the shaft and a pull be required as will be quite apparent. The bar 10 would be swung in the opposite direction toward the other collar.

The series of apertures 14 and 16 and the adjustability of the collars 19 accommodate a large range of adjustments which may be desired in different machinery and under different circumstances as will be quite apparent.

In Figure 7 I have disclosed another arrangement wherein the numeral 30 denotes a driven shaft with a disk 31 fixed thereto having a rim 32.

A block 33 is adjustably mounted in the rim by means of screw 34 in slot 35. A spring 37 is mounted at one end of this block and functions as a buffer as will be apparent later in the description. A bar 39 is pivotally mounted as at 40 and has one end 41 abuttable with the buffer spring 37 and from an intermediate portion of the bar there projects an arm 42 passing through a slack 43 formed in the rim 32.

A plate 44 is mounted on the arm 42 and held against the rim by means of a spring 45 to maintain the slot 43 closed. A pin 46 projects from an intermediate portion of the arm through an arcuate slot 47 in the disk 31 so as to limit the movement of this bar.

A connecting rod or pitman rod 49 is pivotally engaged as at 50 with the outer end of the arm 42. When this pitman rod 49 is moved upwardly it will be seen that the bar 39 is swung to abut the end 41 with the spring 37 to urge the disk in a clockwise direction. Equalizing springs 51 are anchored in the disk and to the lever 39 as at 52. When the pitman gets in a position with its pivot 50 on center a forward pressure is exerted by the buffer spring so as to overcome the inefficiency of the off center position.

This forward pressure on the wrist pin produces a positive and smooth rotation. The entire assembly has a push and pull, most effectively arranged and entirely absent in the ordinary construction.

It is thought that the construction, operation, utility and advantages of this invention will now be quite apparent to those skilled in this art without a more detailed description thereof.

The present embodiments of the invention have been disclosed in considerable detail merely for the purposes of exemplification since in actual practice they attain the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A mechanical movement including a rotary member, a pitman, a bar pivotally engaged at one end to an off center point of the rotary member and extending tangentially thereto, a pitman, a wrist pin connecting the pitman with the other end of the bar, an arcuate member, means for mounting an arcuate member on the rotary member across the bar, stop collars on the arcuate member one to each side of the bar to limit the movement thereof, means for adjusting the arcuate member.

2. A mechanical movement including a rotary member, a pitman, a bar pivotally engaged at one end to an off center point of the rotary member and extending tangentially thereto, a pitman, a wrist pin connecting the pitman with the other end of the bar, an arcuate member, means for mounting an arcuate member on the rotary member across the bar, stop collars on the arcuate member one to each side of the bar to limit the movement thereof, means for adjusting the arcuate member, means for adjustably mounting the collars on the arcuate member.

In testimony whereof I affix my signature.

WILLIAM C. DENHAM.